Figure 1:
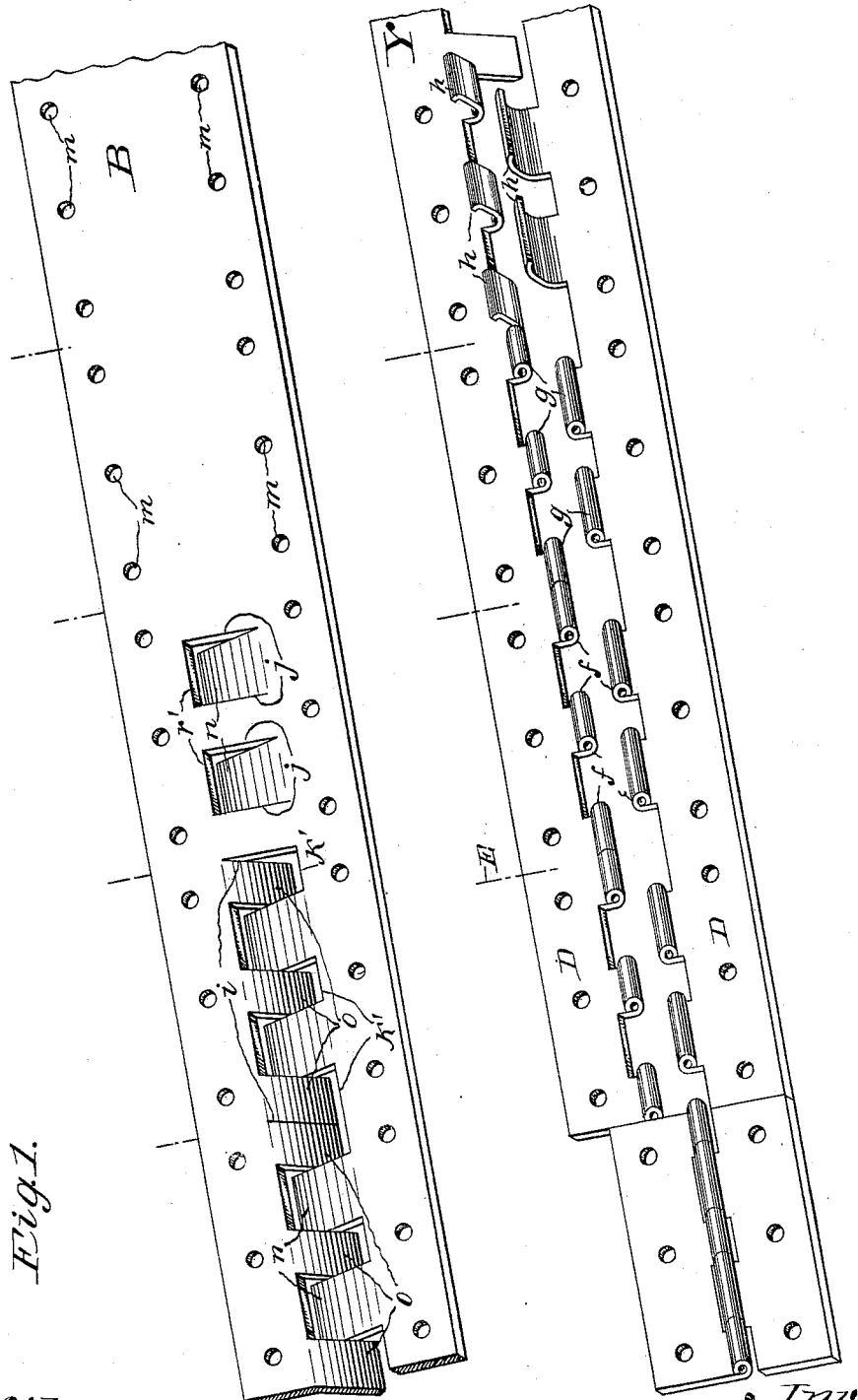

No. 611,714. Patented Oct. 4, 1898.
C. F. SMITH & G. MORTSON.
MACHINE FOR MANUFACTURING SHEET METAL HINGES.
(Application filed Feb. 16, 1898.)

(No Model.) 15 Sheets—Sheet 1.

Witnesses:

Inventors:
Charles F. Smith.
George Mortson.
By their Atty.
Ed. E. Claussen.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 2.

Witnesses:
Geo. E. Smart
Emma O. Dosha

Inventors:
Charles F. Smith.
George Mortson.
By their Atty.
Ed.E. Claussen

No. 611,714. Patented Oct. 4, 1898.
C. F. SMITH & G. MORTSON.
MACHINE FOR MANUFACTURING SHEET METAL HINGES.
(Application filed Feb. 16, 1898.)

(No Model.) 15 Sheets—Sheet 3.

Witnesses:
Geo. L. Smart
Emma O. Doska

Inventors:
Charles F. Smith.
George Mortson.
By Their Atty.
Ed. E. Claussen

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 4.

Witnesses:
Geo. E. Smart
Emma Doska

Inventors:
Charles F. Smith.
George Mortson.
By their Atty.
Ed. E. Claussen.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 5.
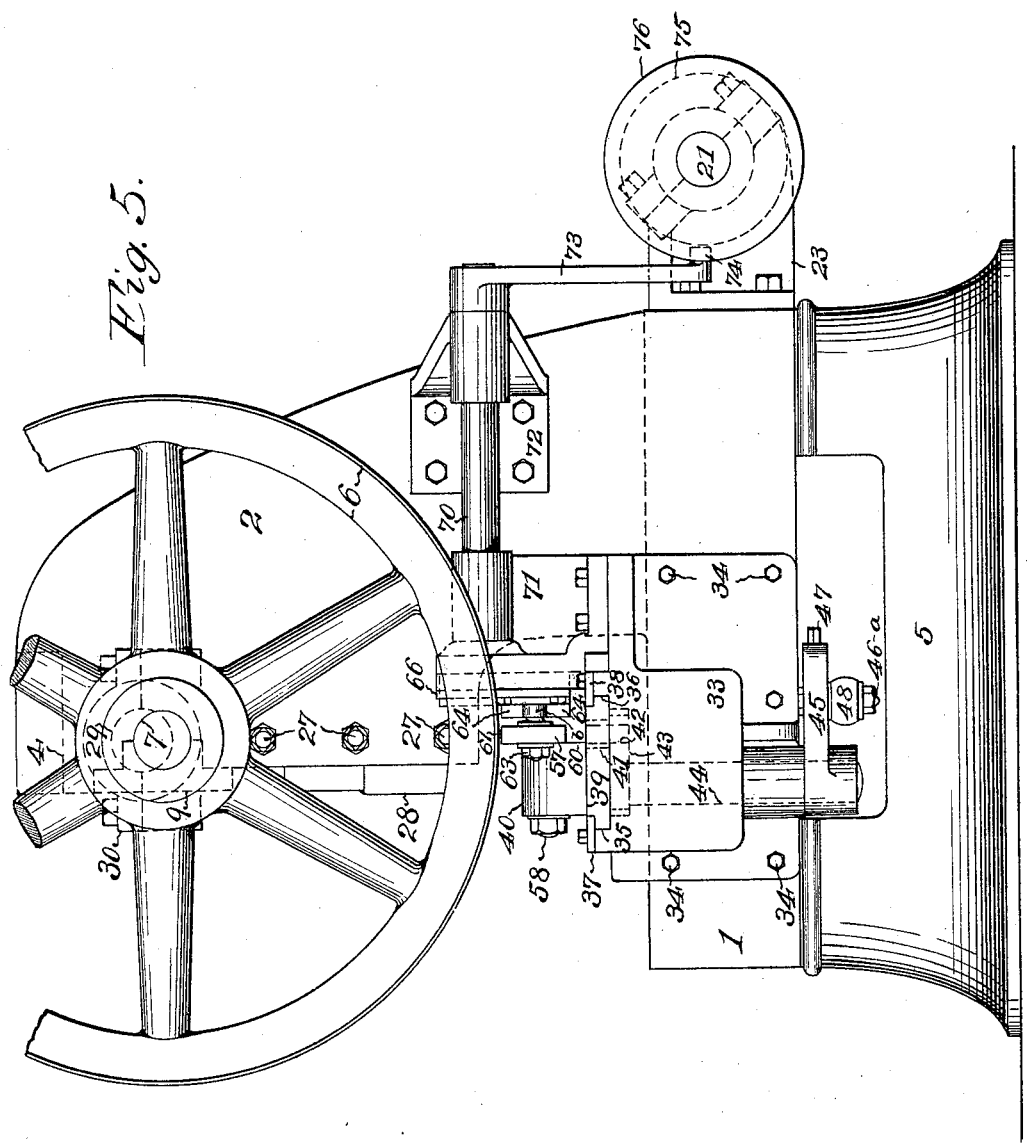
Witnesses:
Geo. I. Smart.
Emma O'Doole
Inventors:
Charles F. Smith.
George Mortson.
By their Atty
Ed. E. Claussen

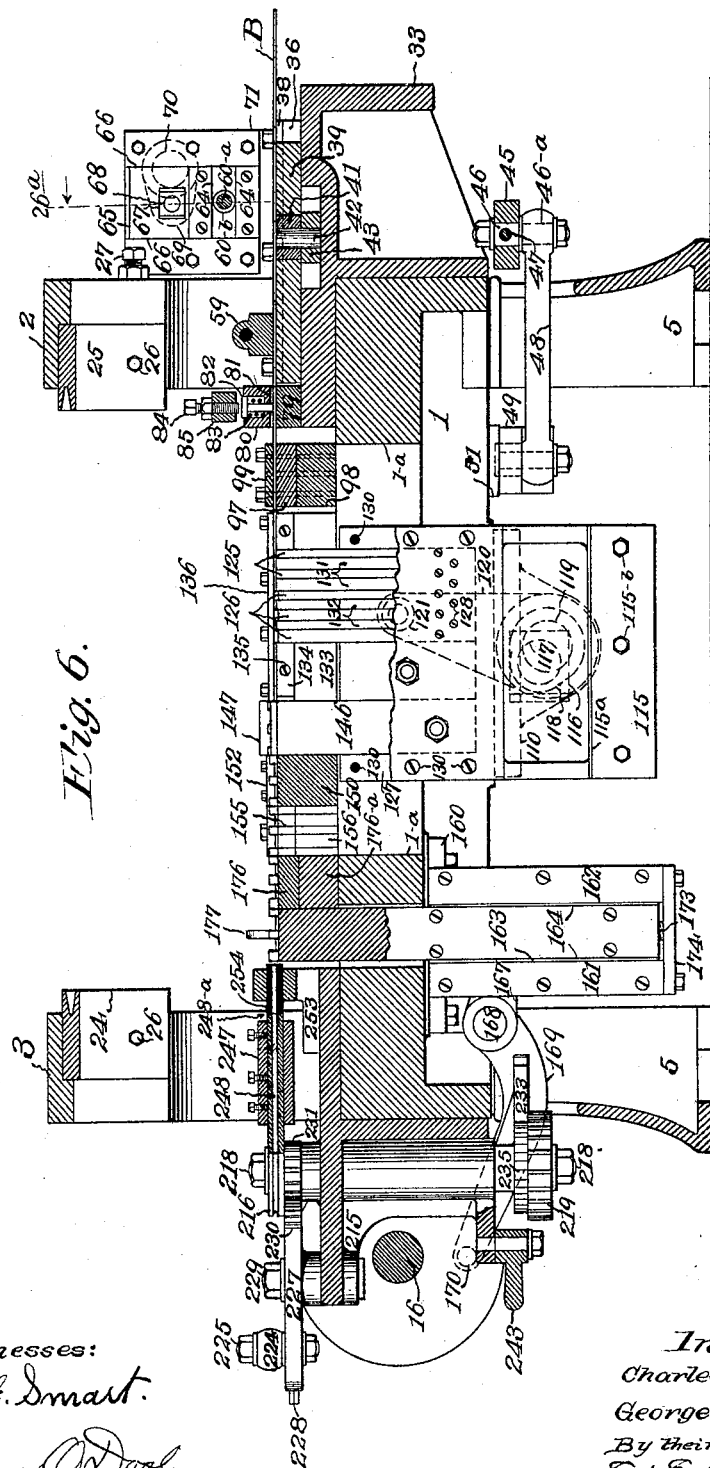

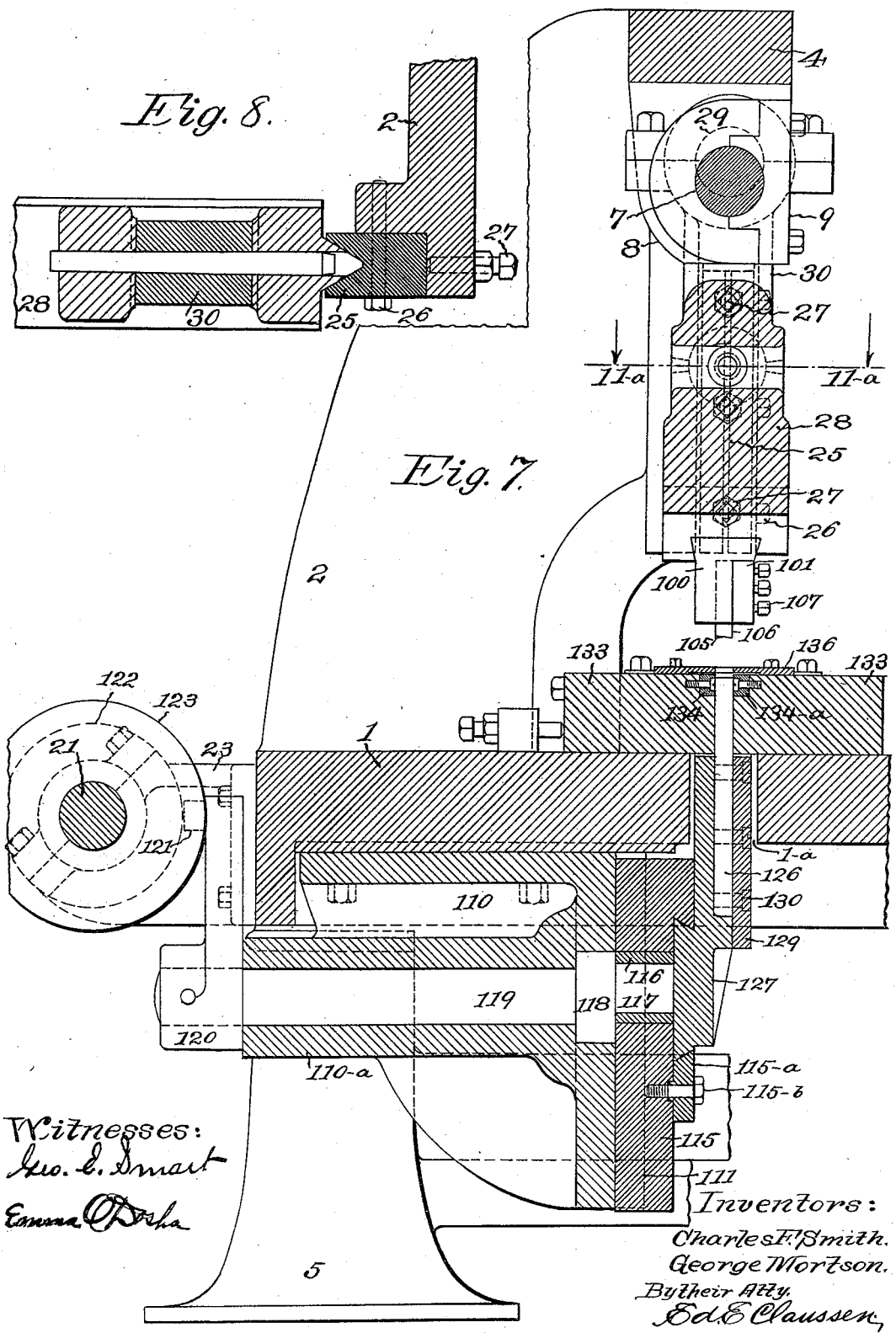

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 8.
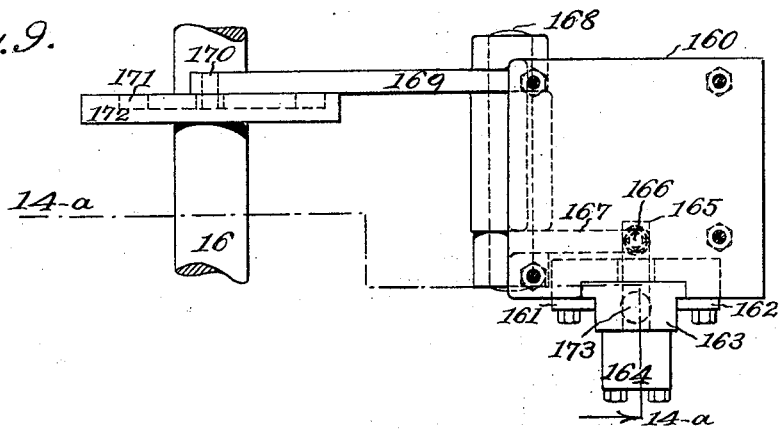
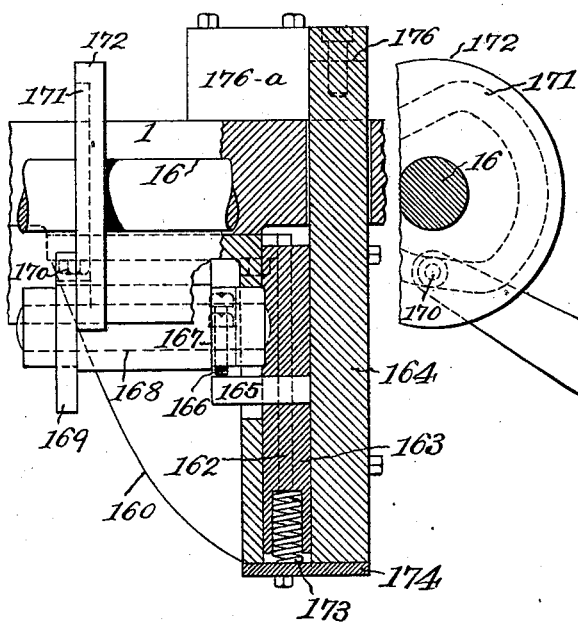
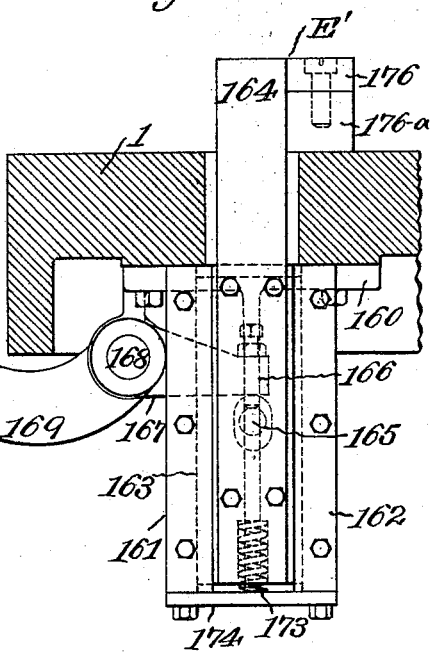
Witnesses:
Geo. E. Smart
Emma Dosha
Inventors:
Charles F. Smith.
George Mortson.
By their Atty.
Ed. E. Claussen.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.)
15 Sheets—Sheet 9.
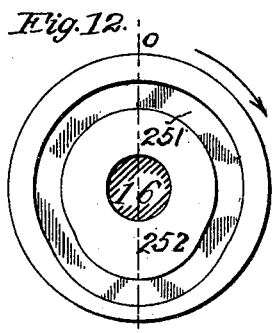
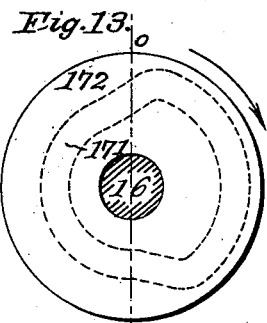
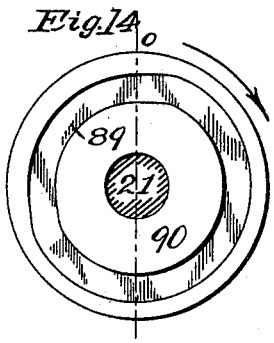
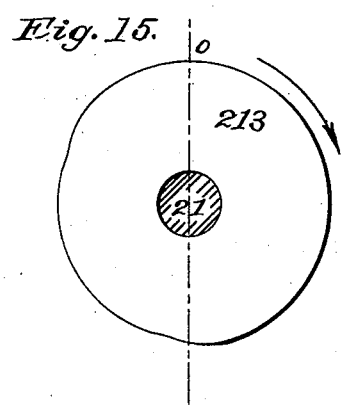
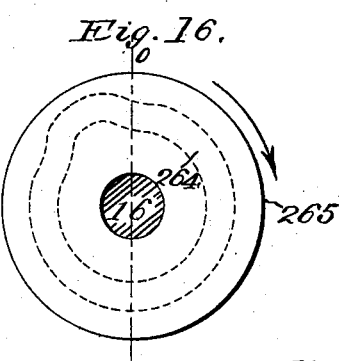
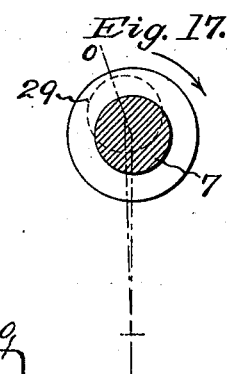
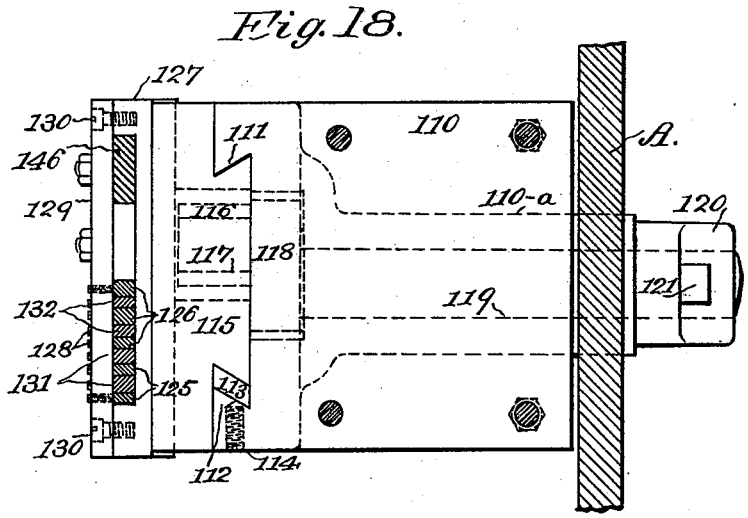
Witnesses:
Geo. E. Smart.
Emma A. Docha.
Inventors:
Charles F. Smith.
George Mortson.
By their Atty.
Ed. E. Claussen.
THE NORRIS PETERS CO., PHOTO-LITHO., WASHINGTON, D. C.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 10.
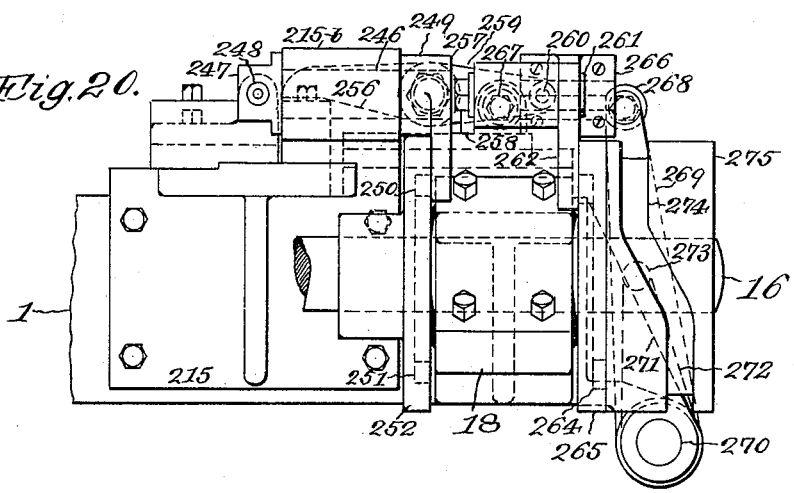
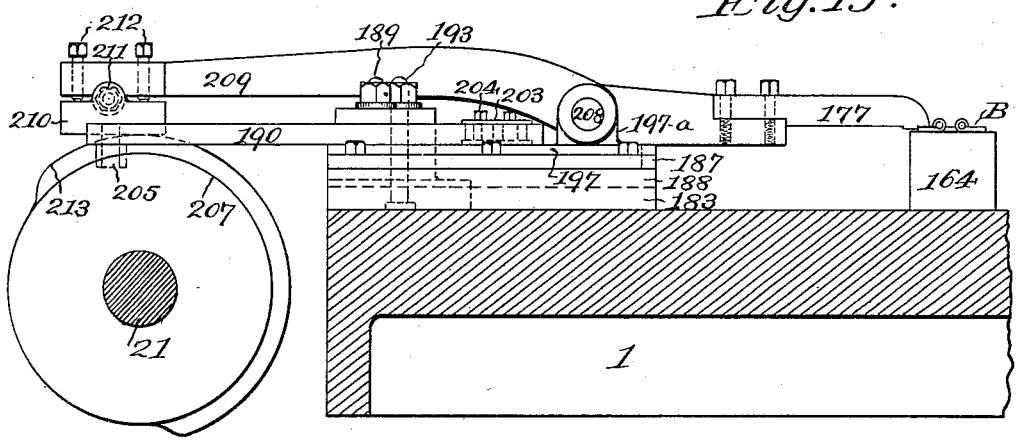
Witnesses:
Inventors:
Charles F. Smith.
George Mortson.
By their Atty.
Ed. E. Claussen No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 11.
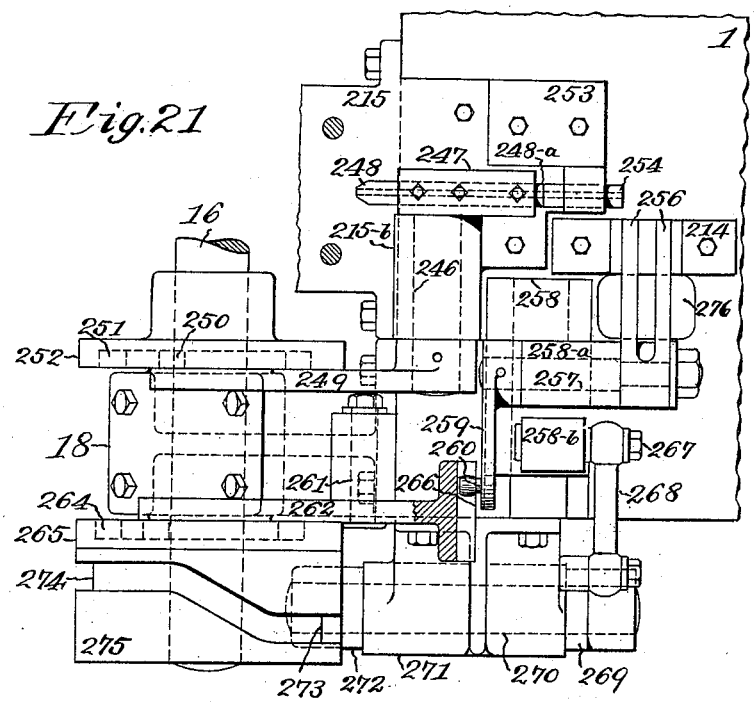
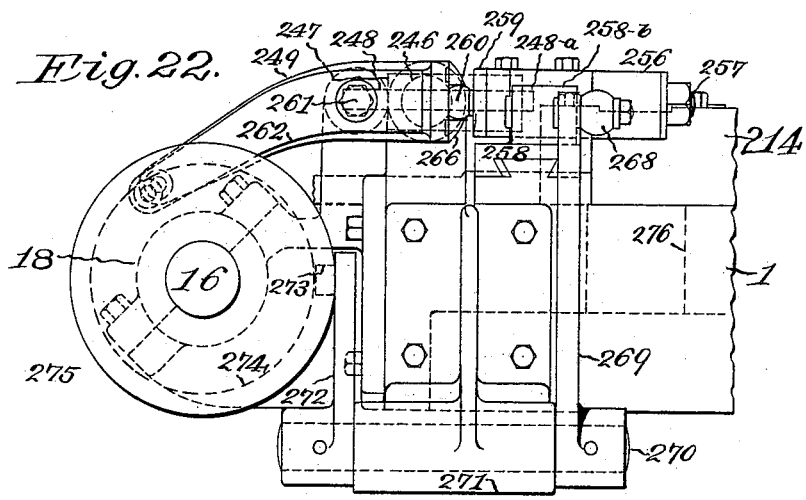
Witnesses: Inventors:
Charles F. Smith.
George Mortson.
By their Atty.
Ed. E. Claussen No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 12.
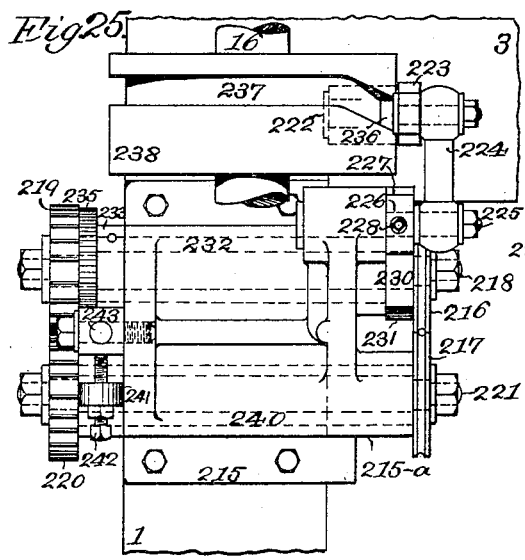
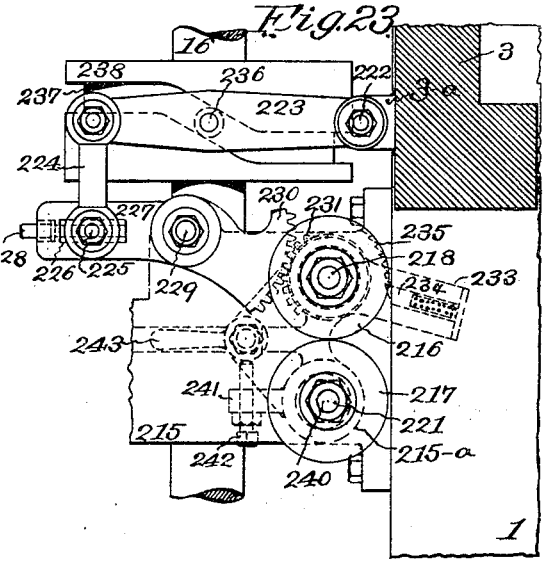
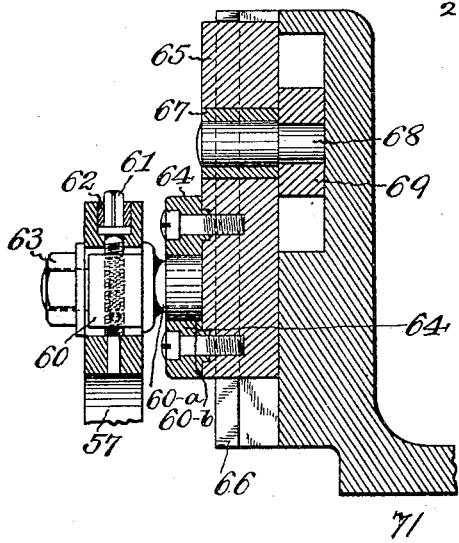
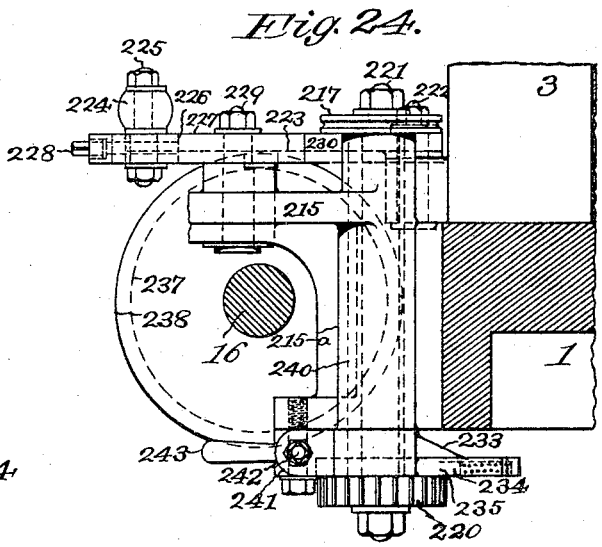
Witnesses:
Geo. E. Smart
Emma O. Dosha
Inventors:
Charles F. Smith.
George Mortson.
By their Atty
Ed. E. Claussen.
THE NORRIS PETERS CO., PHOTO-LITHO., WASHINGTON, D. C.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 13.
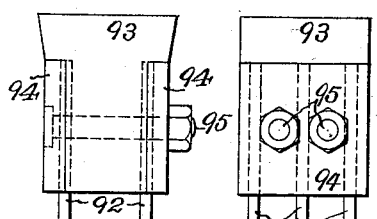
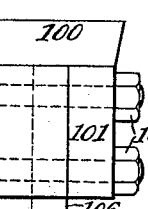
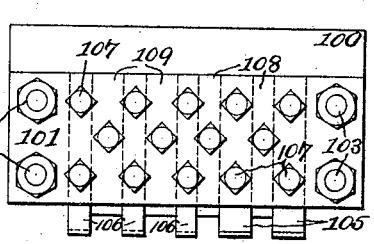
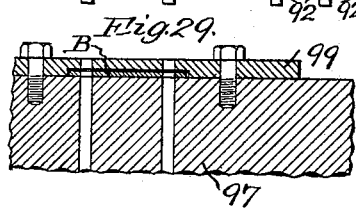
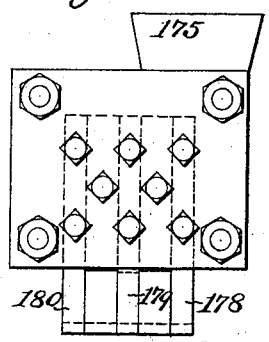
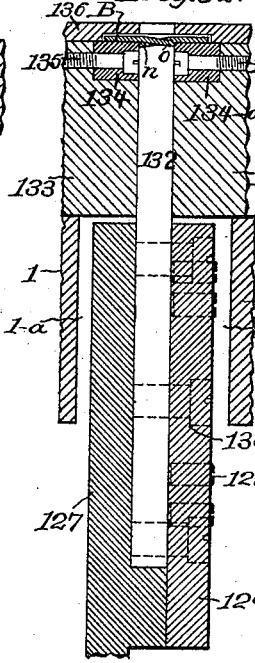
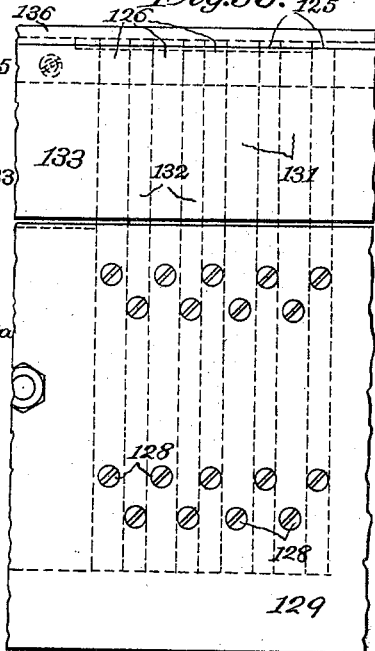
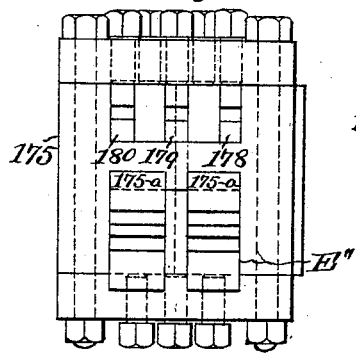
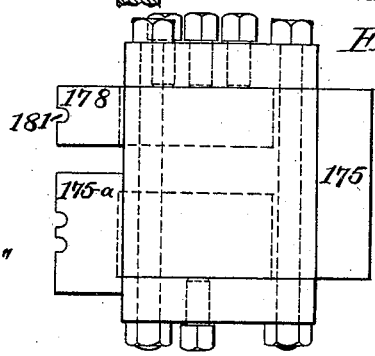
Witnesses:
Geo. L. Smart
Emma ...
Inventors:
Charles F. Smith.
George Mortson.
By their Atty.
Ed. E. Claussen.
THE NORRIS PETERS CO., PHOTO-LITHO., WASHINGTON, D. C.

No. 611,714. Patented Oct. 4, 1898.
C. F. SMITH & G. MORTSON.
MACHINE FOR MANUFACTURING SHEET METAL HINGES.
(Application filed Feb. 16, 1898.)
(No Model.) 15 Sheets—Sheet 14.
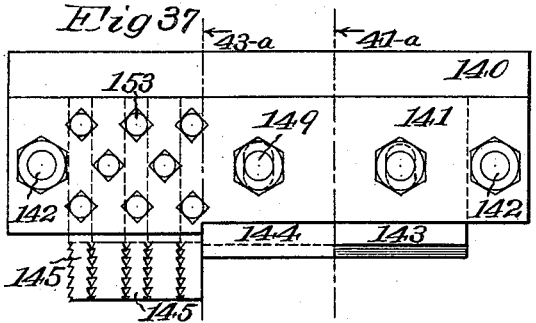
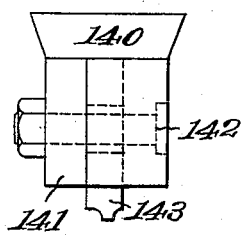
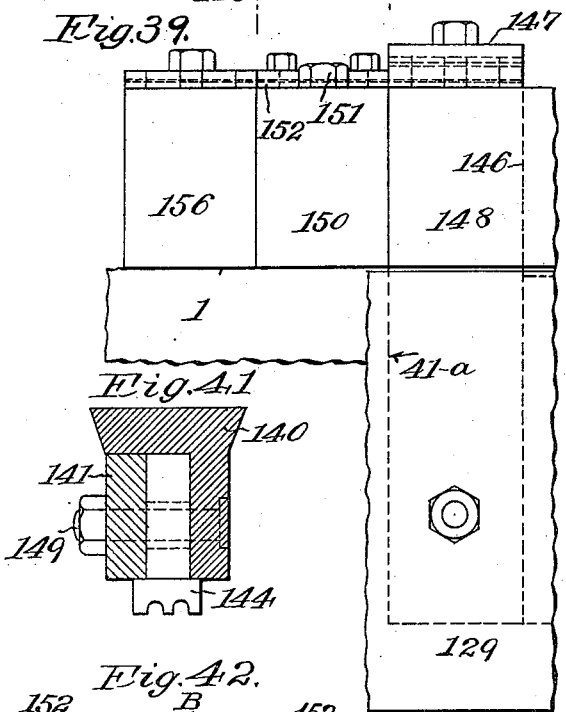
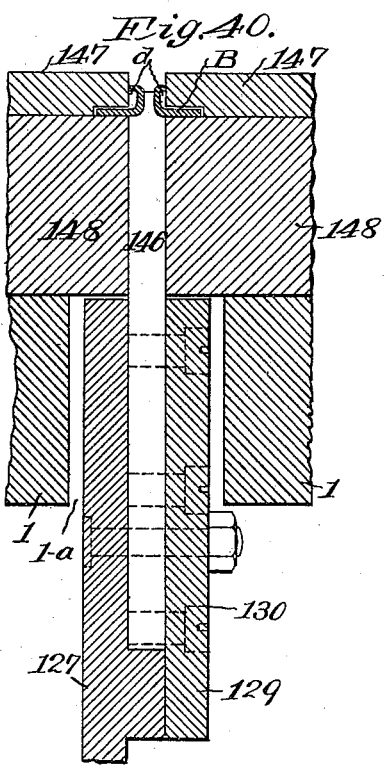
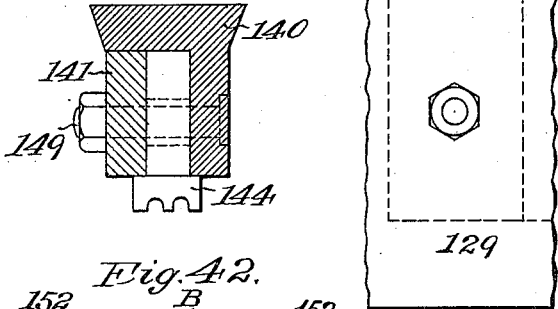
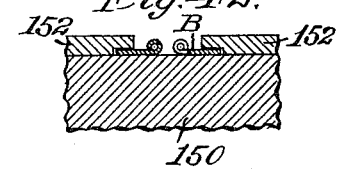
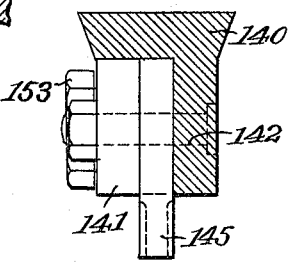
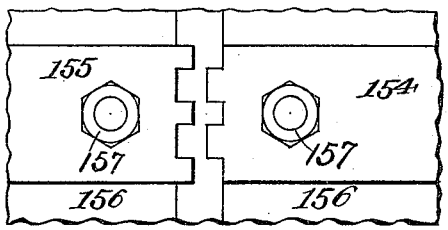
Witnesses:
Geo. E. Smart
Emma O'Doska
Inventors:
Charles F. Smith.
George Mortson.
By their Atty.
Ed. E. Claussen
THE NORRIS PETERS CO., PHOTO-LITHO., WASHINGTON, D. C.

No. 611,714. Patented Oct. 4, 1898.
C. F. SMITH & G. MORTSON.
MACHINE FOR MANUFACTURING SHEET METAL HINGES.
(Application filed Feb. 16, 1898.)

(No Model.) 15 Sheets—Sheet 15.

Witnesses:
Geo. E. Smart
Emma ORosha

Inventors
Charles F. Smith.
George Mortson.
By their Atty.
Ed. E. Claussen

UNITED STATES PATENT OFFICE.

CHARLES F. SMITH, OF BRIDGEPORT, AND GEORGE MORTSON, OF HARTFORD, CONNECTICUT, ASSIGNORS TO THE AETNA MACHINE COMPANY, OF HARTFORD, CONNECTICUT.

MACHINE FOR MANUFACTURING SHEET-METAL HINGES.

SPECIFICATION forming part of Letters Patent No. 611,714, dated October 4, 1898.

Application filed February 16, 1898. Serial No. 670,487. (No model.)

*To all whom it may concern:*

Be it known that we, CHARLES F. SMITH, residing at Bridgeport, in the county of Fairfield, and GEORGE MORTSON, residing at Hartford, in the county of Hartford, State of Connecticut, citizens of the United States, have invented certain new and useful Improvements in Machines for Manufacturing Sheet-Metal Hinges, of which the following is a full, clear, and exact specification.

Our invention relates to machines for making hinges, and particularly relates to machines for manufacturing hinges from sheet metal, having two plates or leaves with edges formed to a knuckle and interlocking and fastened together by a pin or pintle on which they turn.

Applications for foreign patents were filed as follows: in Belgium April 12, 1898, No. 105,330; in France April 9, 1898, No. 264,592; in Germany April 7, 1898, B 22,470, and in Great Britain April 1, 1898, No. 7,834.

Heretofore it has been the usual practice in manufacturing hinges to punch out the leaves separately, then form the knuckle on another machine by any well-known mechanical devices, then assemble the two leaves and insert the pintle, which is usually performed by manual labor, and finally spin or rivet over the ends of the said pintle to complete the hinge. These different operations require various machines, necessitate separate handling, and are therefore slow and expensive.

The leading object of the present invention is to furnish a machine for cheaply, expeditiously, and completely making the finished hinge, means whereby all the necessary operations are made on a metal strip before severing the leaves from that strip without loss of metal or stock, means for cutting the formed leaves from the strip and bringing them in a plane below their normal plane, means for bringing one of the leaves out of the line of the feed to interlock with the second leaf, means for feeding and severing the pintle from an endless wire, means for inserting the pintle into the knuckles of the hinge, means for carrying the hinge bodily out of the line of feed, and means for pressing the three knuckles of the treble-knuckled leaf on the pintle, and thereby completing the same.

As a rule in machines of this class too much is expected and required at a single operation, and not infrequently a cam is called upon to perform several functions at a single operation, which is fundamentally wrong; and it is therefore a further object of our present invention to devise a machine which has separate motions for the various operations, thereby distributing the work over the entire machine more evenly, and also the single elements of the individual instrumentalities respond with greater promptness to their respective requirements, whereby greater perfection is attained in the manufactured article, a larger output is insured, and a great amount of expense and trouble saved.

A still further object of our invention is to provide a series of dies which may be readily removed, separately or bodily, and also be adjusted independently of one another to the requirements and functions for which they are designed.

Another object of our invention is to provide an adjustable assembling device for various widths of leaves to assemble the same and then remove them bodily, so that the future operations may be performed thereon.

The mechanism embodying the preferred structural peculiarities of the different parts of our invention and the preferred disposition of the different parts and the combinations forming the subject-matter of our improvements are illustrated in the accompanying drawings, in which—

Figure 2:
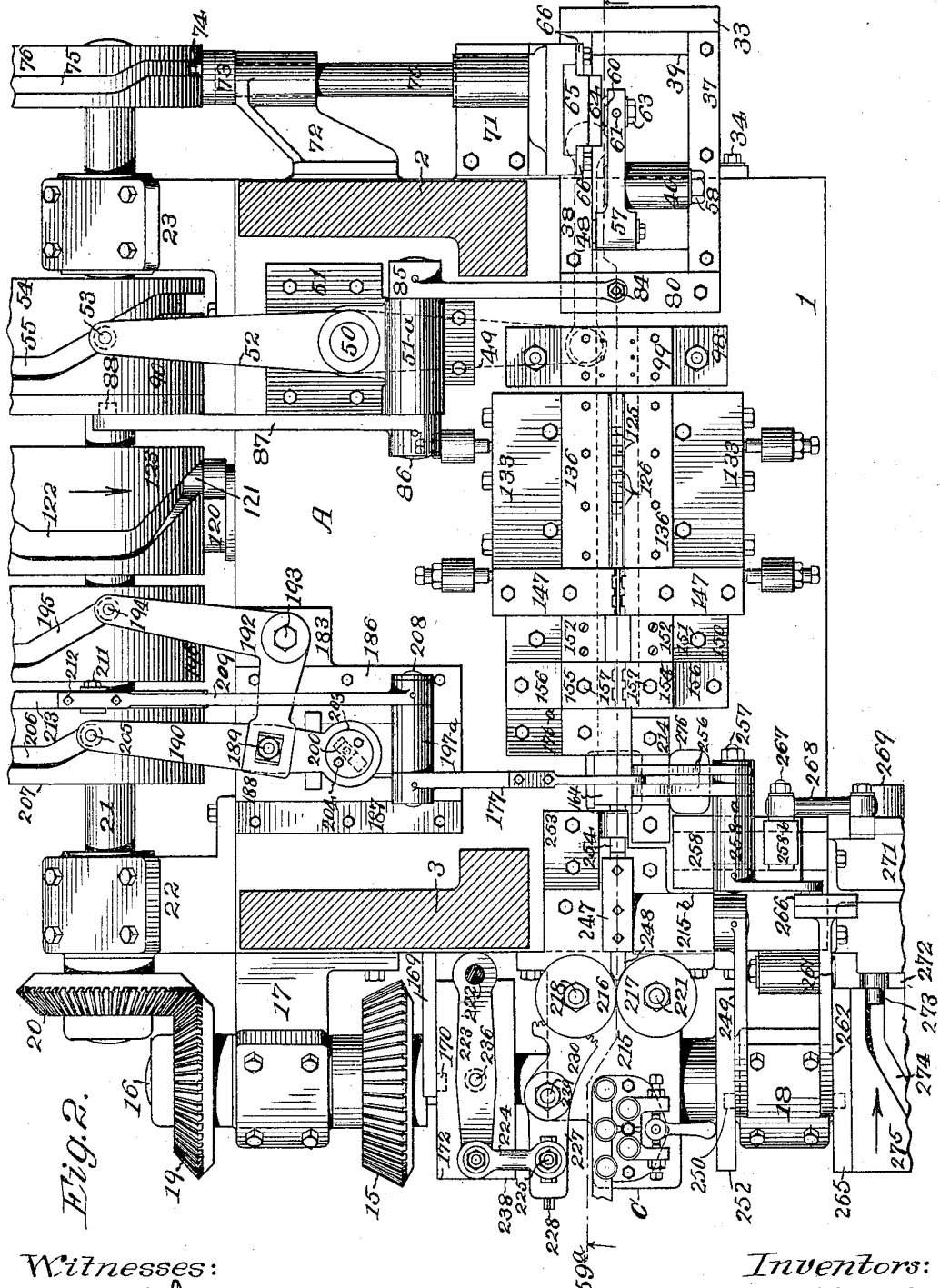
Figure 3:
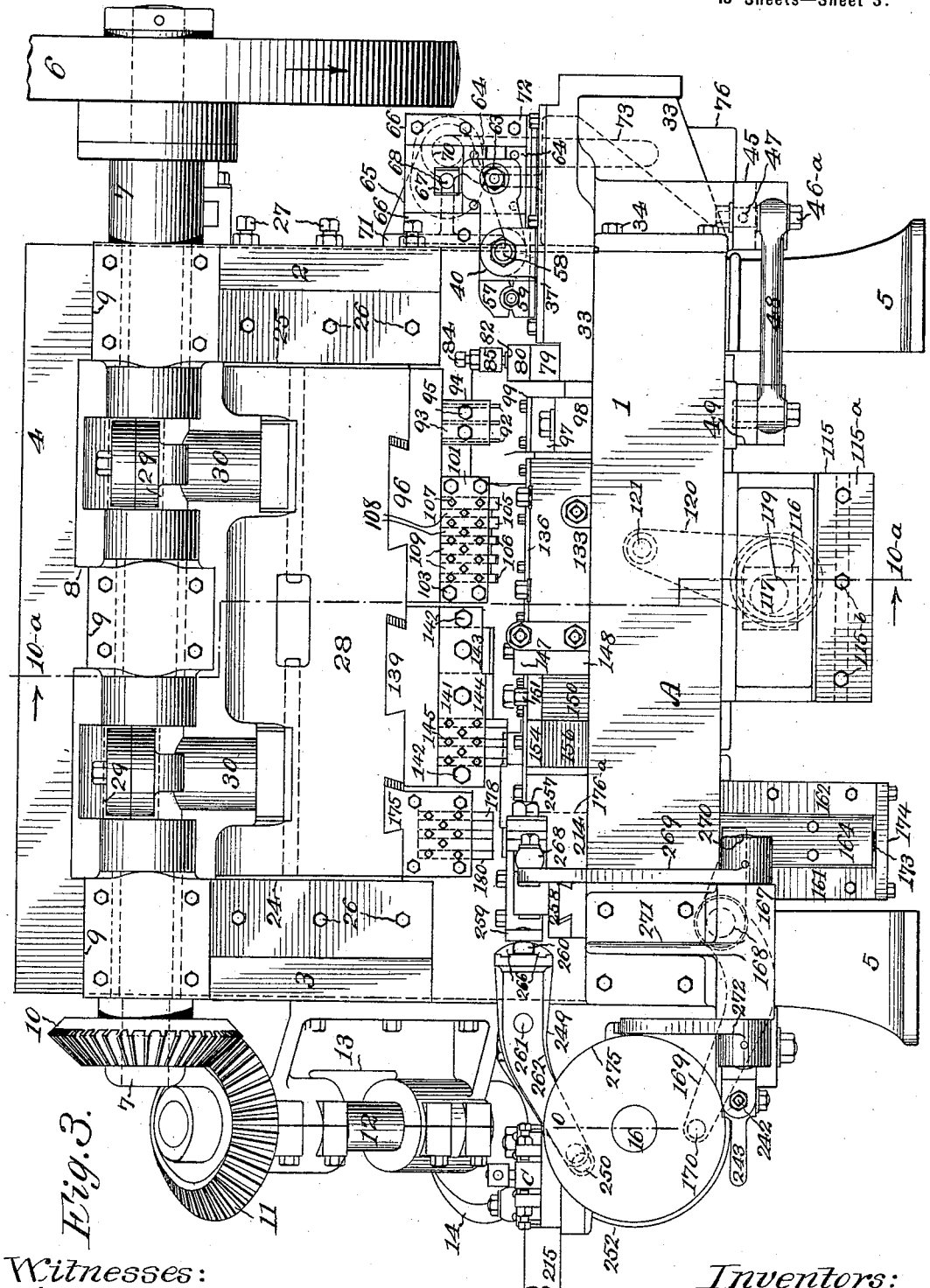
Figure 4:
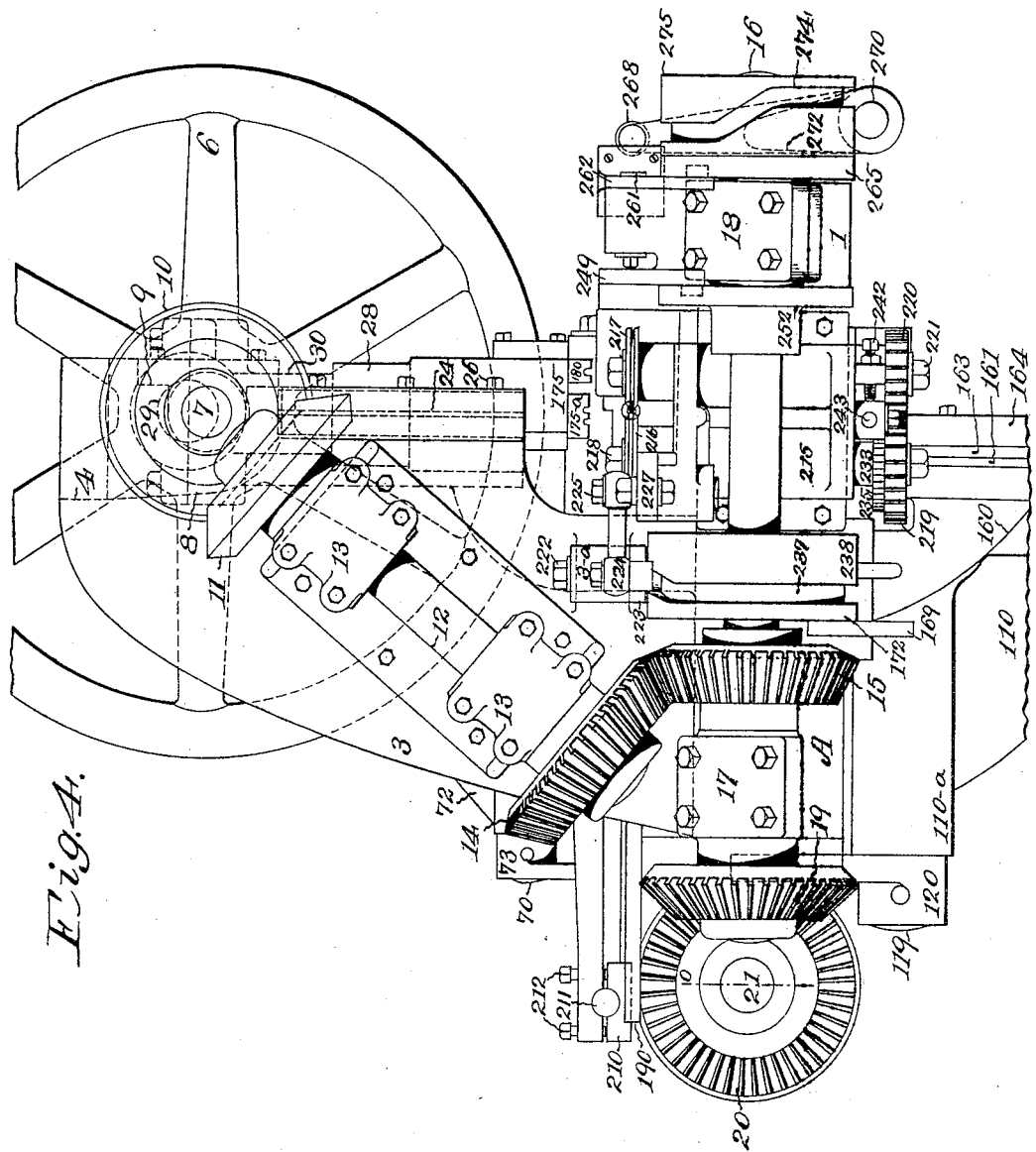
Figure 45:
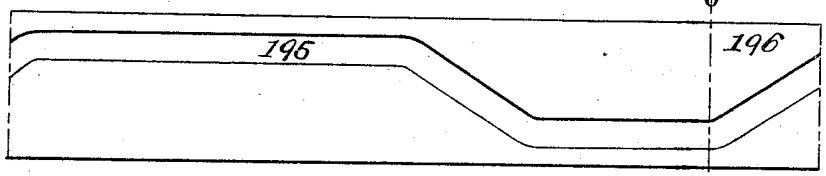
Figure 46:
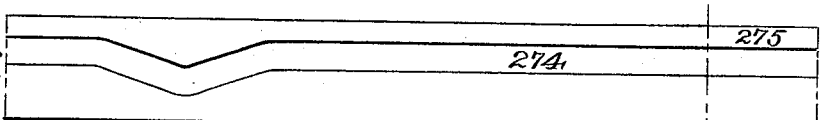
Figure 47:
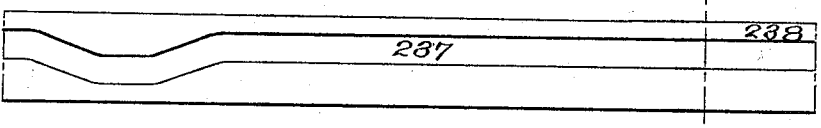
Figure 48:
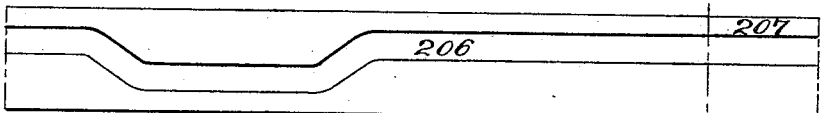
Figure 49:
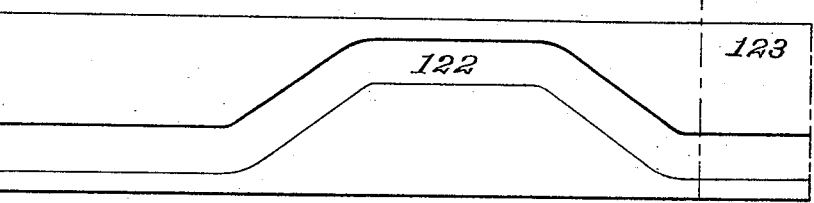
Figure 50:
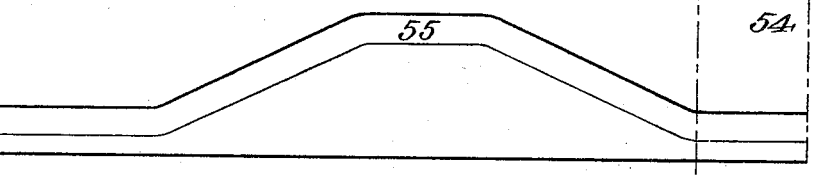
Figure 51:
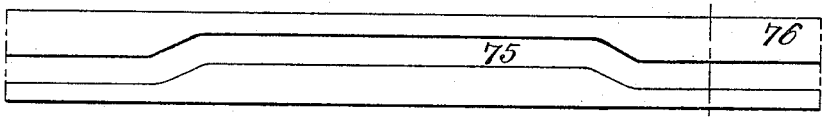

Figure 1 represents a perspective view of a continuous metal strip going through the successive operations of forming the hinge-leaves, the strip being broken off at X and continued at Y. Fig. 2 is a sectional plan view of our improved hinge-making machine having the top part or the upper press mechanism removed. Fig. 3 is a front elevation of that part of the machine which is represented in Fig. 2. Fig. 4 is a left-hand end elevation of what is shown in Fig. 3. Fig. 5 is a right-hand elevation of what is shown in Fig. 3. Fig. 6 is a sectional front elevation of the lower part of the machine, taken on the broken lines 59ª 59ª of Fig. 2. Fig. 7 is a sectional end view on line 10ª 10ª of Fig. 3, looking in the direction of the arrow and drawn on an enlarged scale. Fig. 8 is a sectional plan on lines 11ª 11ª of Fig. 7. Figs. 9, 10, and 11 are fractional plan, front, and end views, respectively, showing the cutting-off die and coöperating supporting-anvil, Fig. 11 being taken on the line 14ª of Fig. 9 and looking in the direction of the arrow. Figs. 12, 13, 14, 15, and 16 are views of the different face-cams. Fig. 17 represents a diagrammatic view of the crank-shaft in relative position to the zero-mark (guide-line 0) of the cam-shafts. Fig. 18 is a fractional plan view of the sub-press gate mechanism. Fig. 19 represents a sectional end view of the adjustable assembling mechanism. Figs. 20, 21, and 22 are respectively end, plan, and front views of the left-hand end of the machine and show the mechanism for cutting off the wire which forms the pintle and the mechanism that carries the finished hinge from the machine. Figs. 23, 24, and 25 are respectively plan, front, and end views of the wire-feed mechanism that determines the length of the pintle. Fig. 26 is a sectional end view taken on line 26ª of Fig. 6, the same being drawn on an enlarged scale and in the direction of the arrow. Figs. 27, 28, and 29 are respectively end, front, and sectional views of the punch and dies for punching the screw-holes $m$ in the sheet-metal strip. These tools, as well as all tools shown in and to Fig. 44, inclusively, are drawn on an enlarged scale. Figs. 30 and 31 represent, respectively, end and front views of the slitting-tools, whereas in Figs. 32 and 33 are represented, respectively, end and front views of their corresponding slitting-dies and cutting-dies. Fig. 32 shows the metal strip in position with the operation completed—that is, having the members $n$ and $o$ slitted and bent downward. Figs. 34, 35, and 36 are respectively front, plan, looking from beneath to the top, and end views of the cutting-off tool and the setting-die that pinches the treble-knuckled leaf down upon the pintle. Fig. 37 is a front view of the forming-tool, the turning-tool, and the broaching-tools. Fig. 38 is an end view of the forming-tool. Fig. 39 is a front view of that which is represented in Fig. 37. Fig. 40 is a sectional end view of the anvil-die, showing the metal strip in position when the operation is completed. Figs. 41 and 42 are sectional end views on line 41ª of Figs. 37 and 39, looking in the direction of the arrow, Fig. 41 showing the turning-tool, whereas in Fig. 42 its supporting-die is shown with the sheet-metal strip in position and the operation completed. Fig. 43 is a sectional end view of the broaching-tools, taken on line 43ª of Fig. 37. Fig. 44 represents a plan view of the supporting surface or die when the broaching-tools are in operation upon the sides of the knuckles. Figs. 45 to 51, inclusive, are layouts of the periphery cams, having the exact contour of the peculiarly-shaped grooves shown.

According to the present invention the sheet-metal strip is fed into the machine by any suitable mechanism, but preferably by the one illustrated, whereby the feed may be adjusted so that the same is absolutely perfect, regular, and uniform.

In the machine hereinafter explained in detail, and which exhibits the best embodiment of our invention now known to us, the first pair of dies punches out the screw-holes by which the hinge is fastened and adapting the same for use, whereas the second operation consists of slitting-dies that force the metal below the normal plane of those members that will eventually form the knuckles of the double-knuckled leaf, while the third pair of dies slits and forces the metal below the normal plane of those members that will eventually form the knuckles of the treble-knuckled leaf. Up to the present all operations have forced the metal below the normal plane of the metal strip, and the next step or fourth operation of our improved machine is to bring the members that form the knuckles of the two leaves above the normal plane of that metal strip and form the first quarter-turn of the knuckles. The fifth operation consists in completing these knuckles to their final circular form, while the sixth operation consists of removing a small portion of the metal at the ends of the knuckles, so that when the two leaves are assembled they will work free and easy, and which we prefer to perform by a broaching operation. The seventh operation then consists in severing the two leaves from the continuous strip, thereby bringing the same a short distance below the normal position of the strip, then assembling the two leaves by bringing the treble-knuckled leaf toward the double-knuckled leaf, inserting the pintle which has been previously straightened and cut to proper length, then bringing the hinge forward out of the line of the feed of the strip, and finally of pressing the knuckles of the treble-knuckled leaf down upon the pintle to hold and prevent the same from dropping out, thereby completing the hinge.

The reference letters and numerals herein used indicate, respectively, the same parts in the different figures of the drawings. The arrows indicate, without further description, the direction of movement of parts. In the accompanying drawings the positions of the various instrumentalities are shown to best advantage, irrespective of the relative positions these parts may have to their respective cam-grooves, and the same is true of all parts hereinafter mentioned, it being considered sufficient for the purpose of this description to assume that the cams are properly cut to effect the various operations required at the proper times and to the proper extent. For the exact contour and the peculiarly-shaped grooves of these cams, as well as to their exact location, as keyed on the several shafts in reference to the position of the crank-shaft a more particular description will follow hereinafter, reference being had to the accompanying drawings.

The letter A designates in a general way the bed of the machine, which may be of any form and construction suitable for carrying the several details of the mechanism. In the form herein shown it consists of a base 1, supporting the two uprights 2 and 3, the same being connected by the cross-tie 4 and the whole supported at each end by the legs 5.

Continuous rotary motion is imparted to the machine by the fly-wheel 6 from any overhead counter-shaft, said wheel being fastened on the crank-shaft 7, which is supported in the uprights 3 and 4 and from the cross-tie by the downwardly-projecting central hanger 8. The caps 9 serve to securely hold that crank-shaft in its proper position. On the rear end the crank-shaft is provided with the miter-gear 10, meshing into the miter 11, fastened on the shaft 12 and journaled in the bracket 13, which is securely fastened to the outer side of the upright 3. At the lower end the shaft 12 carries the bevel-gear 14, meshing into the bevel-gear 15, fastened on the cam-shaft 16, which is journaled in the brackets 17 and 18, fastened to the left-hand end of the base 1. On the rear end of the cam-shaft 16 the same has fastened thereto the miter 19, meshing into the miter 20 and fastened onto the main shaft 21, journaled in the brackets 22 and 23, which are fastened to the rear side of the base 1. The parts above described are all geared in such a manner that to each revolution of the crank-shaft there is one revolution imparted to the cam-shaft and main shaft.

Formed in the uprights 2 and 3 of the machine are the longitudinal slideways 24 and 25, held in position by the bolts 26, whereas the set-screws 27 serve to take up the wear between the plunger 28 and the slideways 24 and 25. The crank-shaft 7 is provided with a series of cranks 29, (in this case two are shown,) to which the connecting-rods 30 are connected in any well-known manner, carrying at their lower ends, pivotally connected, the plunger 28, whereby a reciprocatory motion is attained as the crank-shaft is rotated.

We will now describe the means whereby the sheet-metal strip B is fed into the machine, which is best shown in Figs. 2, 3, 5, and 6.

Mounted upon the base 1, at the right-hand side of the machine, is the feed-bracket 33, held in position by the bolts 34, and which has on its upper surface longitudinal slideways 35 and 36, fitted to which and held in place by the usual straps 37 and 38 is the longitudinally-reciprocating feed-slide 39, having the hub 40, the purpose of which will be more fully explained hereinafter. The feed-slide is provided with a rectangular opening adapted to receive a block 41, into which engages the pin 42 on the arm 43, integral with the shaft 44, which is journaled in a vertically-projecting hub of the feed-bracket 33. At the lower free end of the shaft 44 the same is provided with an arm 45, in which a block 46 is fitted and capable of being adjusted toward or away from the center of the shaft 44 by the screw 47, whereby the throw of the feed-slide may be increased or decreased, according to the relative position the block assumes to the center of the vertical shaft. The block is provided with a threaded portion on its upper end, to which a nut is fitted and by which the same is rigidly clamped to the arm, and has at its lower end and projecting downward the pivot $46^a$, engaging the connecting-rod 48, which again is pivotally connected to the arm 49, which is held on the shaft 50 and supported in a hub of the bracket 51. The shaft 50 holds rigidly secured thereto at its upper end the cam-arm 52, having a roller projection 53, which enters the groove 55 of the cam 54, which is fastened on the main shaft 21. By the mechanism above described the feed-slide is caused to be reciprocated longitudinally to the required stroke.

As previously stated, the feed-slide 39 is provided with the hub 40, and that hub carries, pivotally attached thereto, the clamping-lever 57 by means of the bolt 58, and provided with the swiveled jaw 59. The clamping-lever has fitted thereto at its front end a block 60, as best shown in Fig. 26, adapted to be adjusted up or down by the screw 61, which is held in the clamping-lever by a bushing 62, and serves to regulate the grip on the metal strip or when changing the machine from one thickness of metal to another. When the swivel-jaw of the clamping-lever has been adjusted to the proper amount of grip, the block 60 is clamped to the clamping-lever 57 by the nut 63, and that block is provided with the rearward projection $60^a$, provided with the roll $60^b$, engaging a groove formed by the two parallel bars 64, fastened to the vertical slide 65, which is held in place by the gibs 66. The vertical slide 65 is provided with a rectangular opening, into which a block 67 is fitted, and that block has a cylindrical hole engaged by the pin 68, fastened on the arm 69, integral with the shaft 70, which is mounted for rotation in the brackets 71 and 72, the former being held rigidly screwed to its place on the upper part of the feed-bracket 33 and the latter to the outer side of the upright 2. At the rear free end the shaft 70 has fastened thereto the cam-arm 73, provided with the roller projection 74, engaging the cam-groove 75 of the cam 76, which is fastened to the main shaft 21, and whereby an oscillatory motion is transferred through the instrumentalities the shaft 70, arm 69, pin 68, and block 67, the vertical slide 65 having the parallel bars 64, between which engages the roller 60$^b$ of the clamping-lever 57, to which is mounted the swivel-jaw 59.

The grooves 75 and 55 of the cams 76 and 54 are so timed in relation to one another as to cause the jaw 59 to be raised from the feed-slide, thereby releasing its grip on the metal strip sufficiently to allow the feed-slide to move back, or to the right of Fig. 2, and conveying the clamping-lever, with its jaw, to its starting position. The jaw is then pressed downward onto the metal strip, and when the feed-slide is carried forward will carry the strip into the machine. The construction is such that the parallel bars 64 are long enough to allow for any length of travel to which the feed-slide may be subjected.

Clamping mechanisms are provided to hold the strip in proper position during the retrogressive motion of the feed-slide, as will be most clearly seen in Figs. 2, 3, and 6, and the same consists of the supporting-block 79, fastened on the front end of and resting on the feed-bracket 33. Superimposed on the supporting-block 79 is the guide-block 80, being provided with the opening 81 of sufficient size to permit the metal strip to pass, and also provided with the countersunk hole, into which is fitted the plug 82, held in its upper position by the spring 83.

84 is an adjustable set-screw to regulate the pressure on the strip, the same being held in the lever 85 and fastened on the shaft 86, journaled in a projecting hub 51$^a$ of the bracket 51, the left-hand end having the cam-arm 87 keyed thereto and being provided with the roller projection 88, engaging the cam-groove 89 of the cam 90, which is fastened to the main shaft 21 adjacent to the cam 54. This cam-groove 89 is so timed in relation to the cam-grooves 55 and 75 that the plug 82 is caused to be pressed down onto the metal and held in that position during the time the jaw 59 releases its grip to retract the feed-slide in its rearward position.

*Die and punch mechanism.*—After the sheet-metal strip has been placed in the machine the first operation performed thereon is to punch the six holes $m$ in the strip by punches 92, of circular cross-section, (see Figs. 3, 27, 28, and 29,) mounted in a block 93 and held together by the two caps 94 and bolts 95 and supported in the gate 96, which is keyed to the plunger 28. Below the punches and in alinement with the same are securely fastened the dies or matrices 97 to the die-block 98, which is rigidly secured to the base of the machine. On the upper surface the die 97 is provided with the perforated stripper-plate 99 in the well-known manner. The second and third operations consist of slitting out members $n$ and $o$ from the metal that forms the knuckles for the double-knuckled leaf and the treble-knuckled leaf, respectively, and as those tools are fastened in one block we will describe the same at the same time. The slitting-punches (best shown in Figs. 3, 6, 7, 30, and 31) are rigidly secured in the block 100 and held together by the cap 101, through which bolts 103 pass, the whole supported in the gate 96. The slitting-tools 105 and 106, that slit the members $n$ and $o$, respectively, from the metal strip, consist of straight rectangular bars beveled off at their lower ends and are held in position by set-screws 107 and separated by the blocking-pieces 108 and 109, respectively. This mode of mounting dies for this class of work is of decided importance and great advantage on account of its adaptability of setting each slitting-tool to perform its duty independently of the other, taking the same out to inspect or grind them and replace the same after ground.

The slitting-dies that coöperate with the slitting-tools will now be described. (See Fig. 18.)

Mounted below and projecting through the opening 1$^a$ of the base 1 of the machine is the bracket 110, provided with the vertical slideways 111 and 112, fitted to which and held in place by the usual gib 113 and screws 114 is a vertically-sliding gate-carriage 115, having a rectangular opening, into which is fitted the block 116, engaged by the crank-pin 117 of the arm 118, integral with the shaft 119 and journaled in the hub 110$^a$. The rear projecting end of the shaft 119 is provided with the cam-arm 120, having at its upper end the roller projection 121, engaging the cam-groove 122 of the cam 123, fastened on the main shaft 21. By the means just described a vertical reciprocatory motion is attained by the slitting-dies toward and away from their coöperating slitting-tools.

The slitting-dies 125 and 126, that coöperate with the slitting-tools 105 and 106, are mounted on the sub-press gate 127, and they are held in position by screws 128, tapped into the cap 129, which covers the whole front of the sub-press gate, and that cover is held in position by the screws 130. To remove the slitting-dies when changing the machine from one size of hinge to another, the whole sub-press gate is removed by displacing the clamp-gib 115$^a$, held in position by the screws 115$^b$, whereby the whole sub-press gate can be lowered, taken away, and a different one substituted. The slitting-dies 125 and 126 are of similar construction to the slitting-tools and are held apart by the blocking-pieces 131 and 132, respectively.

On top of the base 1 are securely held the die-blocks 133, provided with the cutting-dies 134 and 134$^a$ and held to the blocks by screws 135.

136 is a stripping-plate secured to the die-block 133, which holds the sheet-metal strip in its proper position, of usual construction.

The timing of the cam-grooves 122 of the cam 123 is in such relation to the rotation of the crank-shaft that the slitting-dies are elevated to the extreme limit of the stroke, thereby supporting the metal strip, and as the plunger 28, with its gate of slitting-tools, descends the rear edges r of the tools 105 shear the metal against the cutting-die 134 and form the edges r'. The front edges k of the tools 106 shear the metal against the cutting-die 134ª, forming the edges k', whereas the sides of the tools 105 and 106 operate in conjunction with the slitting-dies in the sub-press gate and produce the cross-slits j and i, respectively, and thereby the members n and o are forced below the plane of the strip.

*Forcing the metal above the plane of the strip and forming the first quarter-turn.*—This operation is best illustrated in Figs. 37, 38, 39, and 40. Mounted in the plunger 28 is also the gate 139, which has rigidly secured thereto the block 140, provided with a cap 141 and held together by bolts 142. Between the block 140 and the cap 141 is clamped the forming-tool 143, the turning-tool 144, and a series of broaching-tools 145. Coacting with the forming-tool 143 is the anvil-die 146, rigidly secured in the sub-press gate 127, and as the gate-carriage 115 is caused to be raised by the cam-groove 122 the downwardly-projecting members n and o are forced upward between and against the shaping-dies 147, having the shaping-faces d, mounted on the blocks 148, which are securely fastened on the top of the base of the bed. As the gate 139 is then caused to be moved downward the lower rounded working face of the forming-tool forces the metal into the quarter-turn, as represented at h in Fig. 1.

The turning-tool 144 (shown in detail in Figs. 37 and 41) is securely held in the block 140 by means of the cap 141 and bolt 149. The supporting-surface for the sheet-metal strip during the operation of the turning-tool 144 on the quarter-turned members is the block 150, secured to the base 1 by the bolts 151 and provided on top with holding or guide plates 152. As the the plunger 28 descends the two grooved recesses of the turning-tool 144 force the metal down into the circular forms or knuckles g of Fig. 1. As it is of great importance that the knuckles should work free and easy when assembled, it is necessary that the metal at the ends of the knuckles should be slightly removed, which operation is performed by the broaching-tools 145, held in position by the set-screws 153 in the block 140. The supporting-dies 154 and 155 for this broaching are shown in Fig. 44, the front one being provided with two horns supporting the double-knuckled leaf and the rear die being provided with three horns adapted to support the treble-knuckled leaf. The supporting-dies 154 and 155 are held on blocks 156 and screwed to place by bolts 157. As the upper press-gate descends the broaching-tools trim the metal of the knuckles, as shown at f in Fig. 1.

*Mechanism for severing the leaves from the strip and assembling the same.*—Below the base 1 of the machine and screwed to the under side of the same is a bracket 160, provided with vertical slideways, fitted to which and held in place by the usual stops 161 and 162 is the vertically-sliding anvil-carrier 163, attached to which is the anvil 164. Projecting rearward from the anvil-carrier 163 is the stud 165, adapted to engage the set-screw 166 of the arm 167, fastened to the horizontal shaft 168, which is journaled in a hub of the bracket 160 and carries on its rear end the cam-arm 169, provided with the roller projection 170, engaging the cam-groove 171 of the cam 172, which is fastened to the cam-shaft 16. The anvil-carrier 163 is recessed at its lower end, adapted to receive a spring 173, bearing against the end plate 174, and thereby keeping the stud 165 and its coacting parts spring-pressed against the set-screw. On top of the base of the bed, between the anvil 164 and the broaching supporting-block 156, is rigidly mounted the cutting-off die 176, fastened on any convenient supporting-block 176ª. In the plunger 28 is also rigidly mounted the gate 175, that carries the cutting-off tool 175ª, which is bifurcated, so as to straddle the assembling-finger 177, which passes between the two branches of the same. The front side of the gate 175 is provided with a set of setting-tools 178, 179, and 180, which are placed far enough ahead of the cutting-off tool to permit two assembled hinges to rest one ahead of the other. These setting-tools are provided with a recess 181, fitting the treble-knuckled leaf, and whereby the three knuckles are pinched upon the pintle as the upper press-gate descends. The timing of the cam-groove 171, that engages upon the stud 165 of the anvil-carrier 163, is in such relation to the crank-shaft that as the plunger 28 descends, carrying with it the cutting-off tool 175ª, the section D of Fig. 1 has arrived over the anvil in such a position that the line E of Fig. 1 corresponds with the edge E' (see Fig. 10) of the cutting-off die 176 and the edge E'' (see Fig. 35) of the cutting-off tool 175ª, thereby severing the leaves from the strip and bringing the two sections a certain distance below the top surface of the cutting-off die 176 and compressing the spring 173. The cam-groove 171 then causes the arm, with the set-screw 166, to pursue this downward motion of the anvil and holds the same in that downward position for the purpose as will be described later on in the mode of operating the assembling-finger.

The mechanism for assembling the two leaves will now be described.

Mounted on top of the base 1, between the two uprights and near the left-hand end, is securely fastened the bracket 183, provided with the slideways 184 and 185, fitted to which and held in place by the straps 186 and 187 is the reciprocating carriage 188, provided with a bolt 189, to which is pivoted the primary cam-arm 190, having a hub, to which is fitted the block 191. That block engages a rectangular opening in the bell-lever 192, which is pivoted to the stationary fulcrum 193 in the bracket 183. The rearward-projecting arm of the bell-lever is provided with the roller projection 194, adapted to engage the cam-groove 195 of the cam 196, which is rigidly secured to the main shaft 21. Fitted to the carriage 188 is the auxiliary slide 197, provided with the hub 197$^a$, the purpose of which will be more clearly stated hereinafter. Fastened in the auxiliary slide is the pin 198, adapted to receive a block 200, which is fitted to slide in the angular groove 201 of the annular shoulder-ring 202. On top the annular ring is provided with the cap 203 and held thereto by the bolts 204. As the height of the annular ring is slightly less than the thickness of the hub of the primary arm 190, the annular ring may be loosened by letting up on the bolts 204 and slightly turning the annular shouldered ring, thereby changing the angular position of the groove 201 and by tightening the bolts 204 clamp the cap and the annular collar rigidly to the primary arm 190, which carries on its rearward end the roller projection 205, engaging the cam-groove 206 in the cam 207, which is fastened on the main shaft 21.

Pivotally mounted in the hub 197$^a$ of the auxiliary slide is mounted the shaft 208, having on its left-hand end, secured thereto, the assembling-finger 177, and on the right-hand side the cam-lever 209, provided with the swiveled shoe 210, held in engagement with the lever by the bolt 211, and which may be adjusted by the two set-screws 212 to properly engage the cam 213, which is held on the main shaft 21, between the two cams 196 and 207.

The timing of the cam 213, that operates the assembling-finger, the timing of the cam-groove 206, that operates the primary arm 190 and its auxiliary slide 197, and finally the cam-groove 195, that causes to operate the bell-lever 192, that operates the carriage 188, is such in relation to the rotation of the crank-shaft with its plunger 28 that simultaneously as the cutting-off tool severs the members of the two leaves from the strip the assembling-finger descends and grips the treble-knuckled leaf and carries it downward with the descending anvil. Then the cutting-off tool recedes and releases its grip on the treble-knuckled leaf. Then the cam-groove 206 operates the primary arm 190 and moves the auxiliary slide by means of the block 200 and incline-groove 201 forward and assembles the two leaves. Then the pintle is inserted, as will be more fully explained hereinafter. Then the cam-groove 195 operates the bell-lever 192 and moves the assembled leaves from the anvil to the supporting-block 214.

*Mechanism for wire feed and severing.—* At the left hand of the machine and attached to the base of the machine is the bracket 215, upon which the wire-feed mechanism and cutting-off mechanism are fastened, and best shown in Figs. 23, 24, and 25. At a short distance beyond the rear end of the machine is a reel or coil of wire of proper diameter to form the pintle, (not shown in the drawings,) from which the wire is fed into the straightener, of any well-known construction and designated in a general manner by the letter C. The wire is delivered from the straightening-rolls into the bite of the gripping-rolls 216 and 217, which draw the wire through at predetermined intervals and to the required amount. The gripper-roll 216 is securely fastened to the shaft 218, journaled in the vertical hub of the bracket 215 and carrying at its lower end the gear 219, meshing into the gear 220, fastened to the shaft 221, on which at its upper end the gripper-roll 217 is mounted, and whereby any motion which may be imparted to the gripping-roll 216 will also be imparted to the roll 217. Mounted upon the stud 222, adjacent to and on the outside of the upright 3, on a projecting hub 3$^a$, is provided the cam-arm 223, which carries, pivotally jointed, a connecting-rod 224, the forward end of which is supported by the stud 225, which is a part of the block 226, fitted into the rectangular opening of the arm 227. The screw 228 has its threaded portion fitted into the block 226, and thereby the same may be brought closer to or farther away from the fulcrum 229 of the arm. On the oppositely-disposed end of the rectangular opening of the arm the same terminates in the sector 230, which meshes into the sector-pinion 231, provided with a sleeve 232, through the concentric opening of which the shaft 218 passes. At the lower end of the sleeve 232 the ratchet-arm 233 is fastened, adapted to receive the spring-pressed pawl 234, engaging a ratchet-wheel 235, (having only part of its teeth shown in the drawings,) which is securely fastened to the gear 219. The cam-arm 223 is provided with the roller projection 236, engaging the cam-groove 237 of the cam 238, which is fastened on the cam-shaft 16. The timing of the cam-groove 237 is such in relation to the assembling-finger that a piece of wire is fed forward the length of the pintle directly after the assembling-finger brings the two members together when resting on the anvil. The length of the pintle is gaged by the relative position the block 226 assumes in regard to the fulcrum 229. The shaft 221, which respectively carries at its upper and lower ends the gripping-roll 217 and gear 220, is journaled in the eccentric sleeve 240, which is held in the vertical hub 215$^a$ of the bracket 215 and has the projecting flange 241, provided with the set-screw 242, engaging the cam-handle 243, whereby when the cam-handle is turned ninety degrees the set-screw has no surface to rest upon to abut against, and whereby the gripper-roll 217 releases its grip upon the wire.

The wire-cutting-off mechanism (best shown in Figs. 20, 21, and 22) is as follows: Mounted upon and integral with the bracket 215 is the hub 215$^b$, carrying the shaft 246, provided on one end with the head 247, mounted in which is the hardened and ground steel cutting-off bushing 248, having the central opening of same size as the diameter of the wire, and provided with the cutting-surface 248ª. On the other end the shaft 246 receives the cam-arm 249, having a roller projection 250, engaging the cam-groove 251 of cam 252, which is fastened on the shaft 16. On the bracket 215 is also mounted the holder 253, adapted to receive the cutting-off die 254. The timing of the cam 252 is such that at the proper interval, just before the pintle is inserted into the knuckles of the leaves, the head receives an oscillatory motion, thereby severing the pintle from the wire at the cutting edge 248ª. As a means for delivering the completed hinge the gripper-fingers 256 are provided, consisting of a bifurcated lever mounted on the shaft 257, journaled in the hub 258ª of the slide 258, and to which the clamping-lever 259 is attached, having the roller projection 260. The construction of the gripper-fingers is such that the free space between the fingers is equal to the length of the center knuckle of the treble-knuckled leaf, and the width of the fingers corresponds with the length of the knuckles of the double-knuckled leaf. A stud 261, secured in a hub at the top of the bracket 18, is provided, which serves as a fulcrum for the arm 262, which is provided on one side with the roller projection entering the cam-groove 264 of the cam 265, which is fastened on the cam-shaft 16 and adjacent to the bracket 18. On the other end the arm 262 is provided with the two jaws 266, between which the roller projection 260 is held, thereby securing an operative connection between the cam-groove 264 and gripper-finger 256 in whatever position these gripper-fingers may be placed, the jaws 266 being long enough to allow for the length of the stroke of the fingers for which the machine is designed. The slide 258 is also provided with a hub 258ᵇ, which receives the pin 267, to which the connecting-rod 268 is jointed, having attached and pivotally connected to its front end the arm 269, fastened to the shaft 270, journaled in the bracket 271, which is securely held to the front side of the base of the machine. On the oppositely-disposed end the shaft 270 is provided with the cam-arm 272, having the roller projection 273, engaging the cam-groove 274 of the cam 275, which is fastened to the cam-shaft 16 adjacent to the cam 265. The timing of the cam-groove 264, which controls the up-and-down motion of the gripper-fingers 256, and the timing of the cam-groove 274, that governs the reciprocatory motion of the slide and gripper, is such that as soon as the assembling-finger 177 has delivered the hinge onto the supporting-block 214 the gripper-fingers are caused to descend and hold the hinge on that supporting-block, and as the plunger 28 descends (simultaneously cutting off the members of the leaves of the succeeding hinge) the setting-tools 178, 179, and 180, straddling the gripper-fingers, set the knuckles of the treble-knuckled leaf down on the pintle. After the plunger 28 recedes the gripper-fingers are caused to move forward, drawing the hinge along until ejected through the opening 276, where they are deposited in a proper receptacle.

In the drawings, Figs. 45 to 51, inclusive, the exact contour of the grooves of the periphery-cams are shown, the dash-and-dot lines O O representing the vertical line O O of Fig. 4 when the crank is in that position indicated by Fig. 17. In Fig. 12, to and including Fig. 16, the exact grooves in the face-cams are shown, also showing the line O O in relation to the crank-shaft position indicated by Fig. 17.

The operation of the machine is apparent from the foregoing description, and we will therefore describe the same very briefly. The sheet-metal strip, of proper thickness and width, is taken from a coil, straightened by passing through any common straightener, and delivered into the machine on top of the feed-slide 39 and under the clamp-jaw 59, and then passes through the opening 81 of the guide-block 80 and under the plug 82, whereby the metal strip is alternately fed forward and clamped in its position when the machine is in motion. The plunger 28, which receives the screw-hole punches 92, the slitting-dies 105 and 106, the forming-tool 143, the turning-tool 144, the broaching-tools 145, the cutting-off tool 176, and the setting-tools 178, 179, and 180, is capable of vertical reciprocation and operates in unison with the lower press-gate dies 125 126 and the anvil-die 146. When the metal has been slitted by the first pair of dies, the members $n$ are produced, and as the blank is then advanced the length of the hinge the second pair of dies operate thereon and produce the members $o$. As the metal is then fed forward another hinge-length the dies 143 and anvil-die 146 operate on the members and form the quarter-turn $h$. The next operation is performed by the turning-tool 144, completing the formation and producing the knuckles $g$, while the following operation is the broaching of the metal between the knuckles, as at $f$. The next step is the severing of the members from the strip and bringing the same into a plane below the plane of the feed. Simultaneously the assembling-finger 177 is brought to bear upon the treble-knuckled leaf, and as the plunger recedes the assembling-finger brings the leaf toward the double-knuckled leaf, the pintle is inserted through the cutting-off die 254, while the gripper-fingers 256 receive the hinge and transfer the same to the supporting-block 214, where it rests for the setting-tools to perform their function in pinching the three knuckles of the treble-knuckled leaf onto the wire and deliver the completed hinge to the opening 276.

Having thus fully described our invention, what we claim as new, and desire to secure by Letters Patent, is—

1. In a machine of the class specified, the combination of means for feeding a metal strip at predetermined intervals; devices for slitting and forcing members below the plane of the metal strip; means for carrying the members above the plane of the metal strip; devices for completing the circular form of the members to form knuckles; devices for severing the leaves from the endless strip; means for bringing one leaf toward the other and means for inserting the pin, substantially as described.

2. In a hinge-making machine, comprising in combination, a reciprocating feed-slide for supporting a metal strip; means for alternately holding and releasing that strip on that feed-slide; means for slitting and forcing the members below the plane of the metal strip; means for carrying the members above the plane of the metal strip; devices for completing the circular form of the members to form knuckles; devices for severing the leaves from the endless strip; means for bringing one leaf toward the other; means for feeding a wire at predetermined intervals in the opposite direction to that of the metal strip, and inserting the same into the knuckles, all substantially as set forth.

3. In a hinge-making machine, the combination of a longitudinal reciprocating feed-slide, the arm 43 engaging said feed-slide, shaft 44, and arm 45, the connecting-rod 48, arm 49 shaft 50, arm 51 and cam 54, the clamping-lever 57 pivoted in the feed-slide, one of the ends of the clamping-lever adapted to press on the metal strip and the feed-slide, the other end provided with the projection engaging the track parallel to the motion of the feed-slide, devices for moving the track vertical to the motion of the feed-slide, all combined and operating, so that the clamping-finger alternately engages and disengages the metal strip while the feed-slide reciprocates.

4. In a hinge-making machine, the combination of a longitudinal reciprocating feed-slide, the arm 43 engaging said feed-slide, shaft 44, and arm 45, means whereby the distance from the fulcrum to the shaft is adjustable to vary the longitudinal motion of the feed-slide, the rod 48, arm 49, shaft 50 and arm 51 and cam 54, the clamping-lever pivoted in the feed-slide having one of its ends adapted to press on the metal strip and feed-slide, the other end provided with the projection engaging the track parallel to the motion of the feed-slide, devices for moving the track vertically to the motion of the feed-slide, all combined and operating so that the clamping-finger alternately engages and disengages the metal strip while the feed-slide reciprocates.

5. In a hinge-making machine, the combination of a longitudinal reciprocating feed-slide, the arm 43 engaging said feed-slide, shaft 44 and arm 45, the connecting-rod 48, arm 49, shaft 50, arm 51 and cam 54, the clamping-lever 57 pivoted in the feed-slide, one of the ends of the clamping-lever adapted to press on the metal strip and the feed-slide, means for adjusting the block vertically to increase or decrease the grip on the metal strip, the other end provided with the projection engaging the track, located parallel to the motion of the feed-slide, all combined and operating so that the adjustable clamping-finger alternately engages and disengages the metal strip while the feed-slide reciprocates.

6. The combination of a set of dies capable of a vertical reciprocation toward and from each other, of tools mounted in the upper press-gate and so operating with a stationary set of dies; devices to sever the members from the strip and bring the same in a plane below the plane of the feed, means for moving first one member, and finally moving both members in unison.

7. The combination of the upper and lower press-gates supported in the bed of the machine and capable of vertical reciprocation toward and away from each other; of tools mounted in the upper press-gate and coöperating with a stationary set of dies; means for severing the members from the metal strip and forcing the same below the plane of the feed on the anvil 164; devices for moving first one member and finally moving both members in unison in a line vertical to the motion of the feed substantially as described.

8. In a hinge-making machine, the combination with sheet-metal-strip-feeding mechanism; mechanism for forming the knuckles on the members before severing from that strip; devices for severing the members to form the leaves for the hinge, mechanism for transferring first one member, wire-feed mechanism for feeding the wire in the opposite direction to the feed of the metal strip, and mechanism for automatically discharging the two leaves with the inserted pintle, substantially as described.

9. In a hinge-making machine, the combination with sheet-metal-strip-feeding mechanism; mechanism for forming the knuckles on the members before severing from that strip; devices for severing the members to form the leaves for the hinge, mechanism for transferring first one member in a vertical line to the motion of the sheet-metal strip; wire feed and severing devices for inserting the pintle in the opposite direction to the feed of the metal strip and mechanism for discharging the assembled leaves with the inserted pintle substantially as described.

10. In a machine of the class specified, the combination of means for performing successive steps in the formation of several pairs of hinge-leaves from opposite sides of the longitudinal median line of the strip of metal while the leaves remain integral with the strip, means for cutting off the leaves of each pair as they are completed, a device for transferring one of said leaves laterally to bring its knuckles into line with the knuckles of the other leaf, and a pintle-feeding mechanism to feed a pintle forward and insert the same into the knuckles of the assembled leaves, substantially as described.

11. In a hinge-machine the combination, of means of performing successive steps in the formation of several pairs of hinge-leaves from a strip of metal while the leaves remain integral with the strip, means for cutting off and assembling the opposite leaves to bring their knuckles into line, a pintle-feeding mechanism in the line of travel of the strip to feed a pintle in the opposite direction and insert it into the knuckles of the assembled hinge, and means for removing the completed hinge from the line of travel of the strip, substantially as described.

12. The combination, in a hinge-machine, of means for performing successive steps in the formation of several pairs of hinge-leaves from opposite sides of the longitudinal median line of a strip of metal while the leaves remain integral with the strip, means for assembling the opposite leaves to bring their knuckles into line, a pintle-feeding mechanism in the line of travel of the strip to feed a pintle in the opposite direction and insert it into the knuckles of the assembled leaves, and means to pinch the knuckles of one of the leaves upon the pintle, substantially as described.

13. The combination, in a hinge-machine, of a step-by-step strip-feeding mechanism, reciprocating tools for slitting and bending members from opposite sides of the longitudinal median line of the strip out of the plane of the strip, reciprocating tools for bending said members into circular form to constitute knuckles, a reciprocating cutter to sever the opposite leaves from the strip, and means for assembling the opposite leaves of each pair.

14. The combination of the carriage 188, means for reciprocating that carriage, the auxiliary slide 197 mounted in that carriage, means for reciprocating the auxiliary slide at predetermined intervals, the assembling-finger pivotally mounted on that slide, means for vibrating that assembling-finger, all combined and operating, so that the assembling-finger grips one member and carries the same forward two predetermined successive distances substantially as described.

15. The combination of the carriage 188, means for reciprocating the carriage, the auxiliary slide 197 mounted on that carriage, means for reciprocating the auxiliary slide, the arm 190 provided with the annular shouldered ring, the groove 201, the assembling-finger pivotally mounted in the auxiliary slide, means for vibrating that assembling-finger all combined and operating, so that the assembling-finger grips one member to assemble the one with the other, and finally moves both members in unison.

16. The combination of the carriage 188, means for reciprocating that carriage, the auxiliary slide 197 mounted on the carriage, and capable of a reciprocatory motion by a cam, the arm 190 provided with an adjustable throw, consisting of the annular ring provided with the angular groove, means for operating the arm 190 by the cam; the assembling-finger pivotally mounted on the auxiliary slide and means for operating the same by the cam, all substantially as described and for the purpose set forth.

17. The combination of the reciprocating slide 258, provided with the shaft 257, adapted to receive the gripper-finger 256 and arm 259, the arm 262 provided with the jaws 266, and engaging the cam 265, whereby an operative connection is effected between the cam and the gripper-fingers and means for reciprocating the slide 258 consisting of the cam 275 substantially as described.

18. The combination of the reciprocating slide 258, the connecting-rod 268 pivotally attached thereto, the arm 269, shaft 270, arm 272 and cam 275, the slide adapted to receive the shaft 257, provided with the gripper-finger 256 and arm 259, the arm provided with a projection engaging between the jaws 266, devices for giving the jaws a vertical movement to the line of movement of that slide substantially as described.

CHARLES F. SMITH.
GEORGE MORTSON.

Witnesses:
ED. E. CLAUSSEN,
JAMES E. HAMILTON.